Patented Mar. 3, 1953

2,630,436

UNITED STATES PATENT OFFICE 2,630,436

ORGANOTIN PHOSPHATES

James M. Church, Tenafly, N. J., assignor to Metal & Thermit Corporation, New York, N. Y., a corporation of New Jersey No Drawing. Application May 21, 1949, Serial No. 94,747

19 Claims. (Cl. 260—270)

This invention relates to new organotin compounds comprising organotin phosphates in which an organotin portion is connected to a phosphate group through tin and consists of two to three organic radicals connected to a tin atom. It relates further to compositions incorporating the new organotin phosphates, such compositions being themselves new and useful and serving to illustrate one of the uses for the new compounds.

In one form, the compounds may be represented generally by the formula:

$$(R_1R_2Sn)(R_3R_4R_5Sn)PO_4$$

in which $R_1$, $R_2$, $R_3$, $R_4$ and $R_5$ are organic radicals selected from the group consisting of alkyl, aryl, aralkyl and heterocyclic radicals, each of which is connected to tin, which in turn is connected to the phosphate group. Under this definition, a tin atom connected to one or more oxygen atoms of a phosphate group is to be understood as being "connected to a phosphate group." As is evident, the compounds covered by the above formula belong to the class of simple phosphates. Other phosphates may be represented generally as:

$$(R_1R_2R_3Sn)_3PO_4, (R_1R_2Sn)_3(PO_4)_2,$$
$$(R_1R_2R_3Sn)PO_3 \text{ and } (R_1R_2Sn)(PO_3)_2$$

in which $R_1$, $R_2$ and $R_3$ have the values and linkages as above. The invention also comprises the more complex polyphosphates, typical examples of which may be represented as follows:

$$(R_1R_2Sn)_2P_2O_7$$
$$(R_1R_2R_3Sn)_4P_2O_7$$
$$(R_1R_2R_3Sn)_2(R_4R_5Sn)P_2O_7$$
$$(R_1R_2Sn)_2(R_3R_4R_5Sn)P_3O_{10}$$
$$(R_1R_2R_3Sn)_5P_3O_{10}$$
$$(R_1R_2R_3Sn)_3(R_4R_5Sn)P_3O_{10}$$
$$(R_1R_2Sn)_5(P_3O_{10})_2$$

in which $R_1$, $R_2$, $R_3$, $R_4$, and $R_5$ have the same values and linkages as before. As will be seen, in all of these compounds an organotin portion, such as $R_1R_2R_3Sn-$, $R_1R_2Sn=$, etc., is connected to a phosphate group through the tin atom, and in most of the compounds there is at least one organotin portion for each phosphate group.

When the various R groups in the above formulas are alkyl, it is preferred that they contain up to sixteen carbon atoms, and more preferably three to ten. Within the class of alkyl radicals it is intended to include alkenyl, alicyclic and substituted alkyl groups such as methyl, butyl, lauryl, vinyl, allyl, crotyl, cyclopropyl, cyclohexyl, chloropentyl, etc. In the class of aryl radicals it is intended to include groups such as phenyl, tolyl, xylyl, naphthyl, anisyl, chlorophenyl, etc. Aralkyl radicals include groups like benzyl, phenethyl, etc., and heterocyclic radicals include such groups as furyl, pyryl, etc. For each compound the alkyl, aryl, aralkyl or heterocyclic radicals may be the same or different, and mixtures of these radicals are possible.

As specific examples of compounds provided by the invention, there may be mentioned:

Tri-triphenyl tin phosphate
$$(Ph_3Sn)_3PO_4$$
Tributyl tin meta phosphate
$$(C_4H_9)_3SnPO_3$$
Dihexyl tin di-meta phosphate
$$(C_6H_{13})_2Sn(PO_3)_2$$
Diphenyl tin, triphenyl tin, phosphate
$$(Ph_2Sn)(Ph_3Sn)PO_4$$
Tri-dipropyl tin diphosphate
$$[(C_3H_7)_2Sn]_3(PO_4)_2$$
Di-dibutyl tin pyrophosphate
$$[(C_4H_9)_2Sn]_2P_2O_7$$
Didecyl tin, di-trihexyl tin, pyrophosphate
$$[(C_{10}H_{21})_2Sn][(C_6H_{13})_3Sn]_2P_2O_7$$
Tetra-phenyldibutyl tin pyrophosphate
$$[Ph(C_4H_9)_2Sn]_4P_2O_7$$
Penta-triamyl tin triphosphate
$$[(C_5H_{11})_3Sn]_5P_3O_{10}$$
Tri-tributyl tin, dibutyl tin, triphosphate
$$[(C_4H_9)_3Sn]_3[(C_4H_9)_2Sn]P_3O_{10}$$
Tribenzyl tin, di-dihexyl tin, pyrophosphate
$$[(PhCH_2)_3Sn][(C_6H_{13})_2Sn]_2P_3O_{10}$$
Penta-dibutyl tin di-triphosphate
$$[(C_4H_9)_2Sn]_5(P_3O_{10})_2$$

All of the above and related compounds are intended to be included within the scope of the invention, and within the classification which may be defined as organotin phosphates in which the tin, in combination with various organic radicals, is linked to the phosphorous through one or more oxygen atoms.

The organotin phosphates may be made by reacting an organotin halide with an alkali salt of a phosphoric acid i. e., an alkali salt of an ortho-, meta-, pyro-, or hypo-phosphoric acid. Examples of such salts are potassium orthophosphate, ammonium metaphosphate, sodium pyrophosphate, sodium hypophosphate, etc. Organotin halides for the reaction include dialkyl, diaryl, diaralkyl and diheterocyclic tin dihalides, and trialkyl, triaryl, triaralkyl and triheterocyclic tin monohalides, such as dibutyl tin dichloride, diamyl tin dichloride, diphenyl tin dichloride, dibenzyl tin dichloride, difuryl tin dichloride, tributyl tin chloride, triphenyl tin chloride, tribenzyl tin chloride, tripyridyl tin chloride, etc.

The reaction may be carried out by bringing together the organotin halide and the alkali salt of the phosphoric acid in any generally suitable proportions, although for practical reasons a large excess of one reactant is to be avoided. Satisfactory results may be obtained by using stoichiometrical quantities of the reactants.

It is preferable to conduct the reaction at temperatures ranging from about 50 to about 150° C. If a solvent is used, as is desirable, it is advantageous to run the reaction at the boiling point of the solvent, keeping within the above temperature range. Solvents like alcohol, alcohol-water, ether, hexane, heptane, carbon tetrachloride, toluene, etc. are suitable. The reaction may also proceed at room temperatures, although at a reduced rate. At higher temperatures, the reaction may require up to one or two hours for substantial completion. The pressure during the reaction is atmospheric, although it is possible to carry it out under higher or lower pressures.

Alternatively, the organotin phosphates may be made by reacting an organotin halide or an organotin oxide with a phosphoric acid or a derivative of the same. Reaction conditions substantially as just described will prevail. As phosphoric acids, there may be mentioned the ortho-, pyro-, meta-, and hypo- acids; and as derivatives of phosphoric acids the following are useful: phosphorus pentoxide, phosphorus oxychlorides, phosphorus pentachloride.

Examples 1 to 3 may illustrate the preparation of several compounds by various methods. The compound underlined at the beginning of each example is the product of the method described therein.

EXAMPLE 1

*Di-diphenyl tin pyrophosphate*

Approximately 50 g. of diphenyl tin oxide (0.2 M) is mixed with 14.25 g. of phosphorus pentoxide (0.1 M) and 100 cc. of toluene added. The mixture is heated to boiling under reflux for 2 to 3 hours during which time the suspended reactants slowly go into solution. The cooled reaction mixture is washed carefully with cold water, filtered, and the toluene distilled under diminished pressure to leave a thick viscous residue of the di-diphenyl tin pyrophosphate.

EXAMPLE 2

*Tri-tributyl tin phosphate*

A mixture of 155 g. of phosphorus oxychloride (0.1 M) in 100 cc. of toluene is reacted with 92.1 g. of tributyl tin hydroxide (0.3 M) at refluxing temperature for 3 hours during which time hydrogen chloride gas is evolved from the reaction. After cooling the reaction mixture, it is washed with successive water washes, filtered, and the toluene removed by vacuum distillation leaving a residue of tri-tributyl tin phosphate.

EXAMPLE 3

*Tri-tributyl tin, dibutyl tin, triphosphate*

A mixture of 97.5 g. of tributyl tin chloride (0.3 M) and 30.5 g. of dibutyl tin chloride (0.1 M) dissolved in 200 cc. of toluene is slowly added, with vigorous agitation, to a 30 g. quantity of pentasodium triphosphate (0.1 M) dissolved in 200 cc. of water. The combined mixture is heated to reflux for about 1 hour to complete the reaction. The lower salt water layer is removed and the upper toluene solution washed with several water washes, following which it is filtered and the toluene removed by distillation under vacuum, leaving a thick, viscous, syrupy residue as the product.

The organotin phosphates are suitable for use as stabilizers for organic materials containing chloride or other halogen, such as vinyl resins which contain a polymerized vinyl halide, chlorinated paraffins containing from 10 to 40 carbon atoms per molecule, chlorinated stearates, chlorinated biphenyls, DDT, chlorinated rubber, and other preferably high molecular weight halogenated material. As is known, such materials are inherently unstable even under ordinary conditions of normal temperatures, humidities, and the presence of traces of contaminating agents. At the higher temperatures of processing or application their inherent instability is greatly aggravated, resulting in considerable decomposition of the materials and making them more susceptible to attack by chemical agents, such as oxygen of the air. Consequently the properties of these halogenated substances are greatly changed by deterioration and they suffer considerable loss of mechanical strength, solvent characteristics, fluid properties, resistance to aging, and other critical properties. Because of their instability, they are readily discolored upon exposure to light or heat, rendering them useless for the purpose for which they were intended. By adding from about 0.1 to about 10% of an organotin phosphate to the material to be stabilized, a composition is obtained which is greatly improved in stability by comparison with the unstabilized material. Such compositions may include additional ingredients like plasticizers, pigments and fillers of the inorganic or organic type, solvents of a great variety, dyestuffs, etc. Also, the stabilizing effect of the organotin phosphates is not limited to plasticized or solution mixtures as they are effective by merely bringing the stabilizer into contact with the halogenated compound, regardless of their compatibility with other components of the mixtures.

Although the invention has been described in connection with more or less specific embodiments, it will be understood that it is capable of obvious variations without departing from its scope.

In the light of the foregoing description, the following is claimed:

1. A neutral organotin phosphate consisting of at least one organotin group connected to a phosphate group through tin and in which every acidic valence of the phosphate moiety is satisfied by an organotin group, said organotin group consisting of two to three organic radicals connected to tin, and each said organic radical being one selected from the class consisting of alkyl, aralkyl, aryl, and heterocyclic radicals.

2. A neutral organotin phosphate consisting of at least one organotin group connected to a phosphate group through tin and in which every acidic valence of the phosphate moiety is satisfied by an organotin group, said organotin group consisting of two to three alkyl radicals connected to tin, each alkyl having up to 16 carbon atoms.

3. A neutral organotin phosphate consisting of at least one organotin group connected to a phosphate group through tin and in which every acidic valence of the phosphate moiety is satisfied by an organotin group, said organotin group consisting of two to three alkyl radicals connected to tin, each alkyl having 3 to 6 carbon atoms.

4. A neutral organotin phosphate consisting of at least one organotin group connected to a phosphate group through tin and in which every acidic valence of the phosphate moiety is satisfied by an organotin group, said organotin group consisting of three organic radicals connected to tin, and each said organic radical being one selected from the class consisting of alkyl, aralkyl, aryl, and heterocyclic radicals.

5. A neutral organotin phosphate consisting of at least one organotin group connected to a phosphate group through tin and in which every acidic valence of the phosphate moiety is satisfied by an organotin group, said organotin group consisting of three alkyl radicals connected to tin, each alkyl having up to 16 carbon atoms.

6. A neutral organotin phosphate consisting of at least one organotin group connected to a phosphate group through tin and in which every acidic valence of the phosphate moiety is satisfied by an organotin group, said organotin group consisting of three alkyl radicals connected to tin, each alkyl having 3 to 6 carbon atoms.

7. A neutral organotin phosphate consisting of at least one organotin group connected to a phosphate group through tin and in which every acidic valence of the phosphate moiety is satisfied by an organotin group, said organotin group consisting of two organic radicals connected to tin, and each said organic radical being one selected from the class consisting of alkyl, aralkyl, aryl, and heterocyclic radicals.

8. A neutral organotin phosphate consisting of at least one organotin group connected to a phosphate group through tin and in which every acidic valence of the phosphate moiety is satisfied by an organotin group, said organotin group consisting of two alkyl radicals connected to tin, each alkyl having up to 16 carbon atoms.

9. A neutral organotin phosphate consisting of at least one organotin group connected to a phosphate group through tin and in which every acidic valence of the phosphate moiety is satisfied by an organotin group, said organotin group consisting of two alkyl radicals connected to tin, each alkyl having 3 to 6 carbon atoms.

10. A neutral organotin phosphate consisting of at least one organotin group and at least one phosphate group, the organotin moiety being connected to the phosphate moiety through tin, each said phosphate group having one to four phosphorus atoms, every acidic valence of the phosphate moiety being satisfied by an organotin group, and each said organotin group consisting of two to three organic radicals connected to tin, and each said organic radical being one selected from the class consisting of alkyl, aralkyl, aryl, and heterocyclic radicals.

11. A neutral organotin phosphate consisting of at least one organotin group connected to a phosphate group through tin and in which every acidic valence of the phosphate moiety is satisfied by an organotin group, said organotin group consisting of two to three aryl radicals connected to tin.

12. A neutral organotin phosphate consisting of at least one organotin group connected to a phosphate group through tin and in which every acidic valence of the phosphate moiety is satisfied by an organotin group, said organotin group consisting of two to three aralkyl radicals connected to tin.

13. A neutral organotin phosphate consisting of at least one organotin group connected to a phosphate group through tin and in which every acidic valence of the phosphate moiety is satisfied by an organotin group, said organotin group consisting of two to three heterocyclic radicals connected to tin.

14. A neutral organotin phosphate consisting of at least one organotin group connected to a phosphate group through tin and in which every acidic valence of the phosphate moiety is satisfied by an organotin group, said organotin group consisting of three aryl radicals connected to tin.

15. A neutral organotin phosphate consisting of at least one organotin group connected to a phosphate group through tin and in which every acidic valence of the phosphate moiety is satisfied by an organotin group, said organotin group consisting of three aralkyl radicals connected to tin.

16. A neutral organotin phosphate consisting of at least one organotin group connected to a phosphate group through tin and in which every acidic valence of the phosphate moiety is satisfied by a organotin group, said organotin group consisting of three heterocyclic radicals connected to tin.

17. A neutral organotin phosphate consisting of at least one organotin group connected to a phosphate group through tin and in which every acidic valence of the phosphate moiety is satisfied by an organotin group, said organotin group consisting of two aryl radicals connected to tin.

18. A neutral organotin phosphate consisting of at least one organotin group connected to a phosphate group through tin and in which every acidic valence of the phosphate moiety is satisfied by an organotin group, said organotin group consisting of two aralkyl radicals connected to tin.

19. A neutral organotin phosphate consisting of at least one organotin group connected to a phosphate group through tin and in which every acidic valence of the phosphate moiety is satisfied by an organotin group, said organotin group consisting of two heterocyclic radicals connected to tin.

JAMES M. CHURCH.

REFERENCES CITED

The following references are of record in the file of this patent:

UNITED STATES PATENTS

| Number | Name | Date |
| --- | --- | --- |
| 2,307,075 | Quattlebaum et al. | Jan. 5, 1943 |
| 2,394,418 | Quattlebaum et al. | Feb. 5, 1946 |
| 2,476,037 | Giammaria | July 12, 1949 |

OTHER REFERENCES

Jahresbericht über Fortschritte der Chemie, 1860, pp. 377–378.

Goddard et al., Textbook of Inorganic Chemistry, vol. XI, part 1, pp. 305–306.

Krause, Die Chemie der Metall-Organischen Verbindungen, p. 330. Edwards Brothers Inc., Ann Arbor, Mich., 1943.